3,157,484
TREE KILLING AGENTS
Lewis C. Swain, Exeter, N.H.; Helen D. Swain, executrix of said Lewis C. Swain, deceased, assignor to Joseph Seiberlich, Brookfield, N.H., and Herman L. Smith, Exeter, N.H.
No Drawing. Filed Sept. 14, 1961, Ser. No. 137,954
2 Claims. (Cl. 71—2.2)

The present invention relates to agents for killing trees.

In the management of woodlands, it is an accepted practice to kill, by means of chemicals, trees that are to be removed. The procedure, generally, involves the removal of some bark or cutting through the bark to expose wood into which the active killing agent is introduced in various ways. The killing agents that have been used present serious problems for, while poisonous to trees and shrubs, they are, in many cases, also poisonous to man and animals. As a consequence, attempts have been made to enable the suitable poisons to be used more safely and with less danger to man and animals.

The killing agents have been applied with a brush, as a spray, or spooned into the opening through the bark. They have also been applied to absorptive carriers that can be inserted into the tree in contact with the wood. When the killing agent is in liquid form, the danger of spilling is substantial and while that danger is eliminated by using killing agents in solid form, their cost is relatively great and their action on the trees retarded.

The objective of the present invention is to provide a tree killing agent that, while in liquid form, is safer to use with increased tree-killing efficiency than previous liquid agents, and this objective is attained by providing a solution characterized by such elevated viscosity that it is highly viscous and of gelatinous, paste-like consistency so that the danger of spilling is minimized and dispensing may be effected by packaging the agents in non-breakable containers of the squeeze type.

In practice, an aqueous solution of sodium arsenite is used as it is an effective tree killer although highly toxic to all animal life. The viscosity of the solution is then increased without affecting, but rather improving, its storage life and its effectiveness in use and this is accomplished by using a gel that is stable against reaction with the sodium arsenite and that is also film-forming thus to protect a poison application against overly rapid evaporation and safeguard against any possible contamination of surrounding areas. Such a gel is selected from the group consisting of carboxymethylcellulose, methylcellulose, and sodium alginate and is present in amounts ensuring that the agent is of a highly viscous, gelatinous, paste-like consistency. It is desired that the agent have a viscosity of about 328 centipoises and a density of about 1.487 at 25° C.

As one example of the invention, a tree killing agent has about 30% by weight of sodium arsenite and about .15% by weight of carboxymethylcellulose. In another example, the percentage of weight of the sodium arsenite was 20% and it was thickened by about 2% by weight of sodium alginate. In a third example, about 40% by weight of sodium arsenate was used with .1% by weight of methylcellulose. In general, the gels may be used interchangeably in about the same amounts.

Because of the viscosity of tree killing agents in accordance with the invention and because of their film-forming characteristic, the agents can be in a more concentrated form than would be safe for a free flowing liquid and can be carried in elastic containers such as plastic squeeze bottles that facilitate the application of desired amounts to exposed tree wood thus minimizing the dangers of a liquid agent and the expense of and time consumed in the use of poison treated carriers.

I claim:
1. A tree killing agent comprising an aqueous solution of sodium arsenite and a film forming gel, the sodium arsenite being present in the range of from 20% to 40% by weight and the film forming gel being present in the range of from .1% to .2% by weight, the gel being selected from the group consisting of carboxymethylcelluluose, methylcellulose and sodium alginate; said agent having a viscosity of about 328 centipoises and a density of about 1.487 at 25° centigrade.

2. A tree killing agent comprising an aqueous solution of sodium arsenite and a film forming gel, the sodium arsenite being approximately 30% by weight of the agent and the film forming gel being approximately .15% by weight of the agent, the gel being selected from the group consisting of carboxymethylcellulose, methylcellulose and sodium alginate; said agent having a viscosity of about 328 centipoises and a density of about 1.487% at 25° centigrade.

References Cited in the file of this patent

UNITED STATES PATENTS

| 2,324,968 | White | July 20, 1943 |
| 2,853,420 | Lowey | Sept. 23, 1958 |
| 2,896,375 | Ryznar | July 28, 1959 |
| 2,951,753 | Groves | Sept. 6, 1960 |

OTHER REFERENCES

Ahlgren et al., Principles of Weed Control, published by John Wiley and Sons, Inc., New York, 1951, pages 237 to 243 (pages 239, 240 and 242 particularly relied on).